US007987237B2

(12) United States Patent
Matsuura

(10) Patent No.: US 7,987,237 B2
(45) Date of Patent: Jul. 26, 2011

(54) SERVER APPARATUS FOR PROVIDING DISPLAY SCREEN THROUGH NETWORK, CONTROL METHOD THEREFOR, AND PROGRAM THEREFOR

(75) Inventor: Kenichiro Matsuura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 875 days.

(21) Appl. No.: 11/230,867

(22) Filed: Sep. 21, 2005

(65) Prior Publication Data

US 2006/0064361 A1    Mar. 23, 2006

(30) Foreign Application Priority Data

Sep. 22, 2004  (JP) ................... 2004-275031

(51) Int. Cl.
*G06F 15/16* (2006.01)
(52) U.S. Cl. ........ 709/207; 709/217; 709/203; 709/219; 715/840
(58) Field of Classification Search ............. 709/207
See application file for complete search history.

(56) References Cited

U.S. PATENT DOCUMENTS

| | | | | |
|---|---|---|---|---|
| 5,737,560 A * | 4/1998 | Yohanan | ........................ | 715/847 |
| 5,774,670 A | 6/1998 | Montulli | ........................ | 709/227 |
| 5,781,914 A * | 7/1998 | Stork et al. | ..................... | 715/234 |
| 5,848,413 A * | 12/1998 | Wolff | .............................. | 707/10 |
| 5,963,915 A * | 10/1999 | Kirsch | ........................... | 705/26 |
| 5,963,945 A * | 10/1999 | Pal | ........................................ | 1/1 |
| 6,047,268 A | 4/2000 | Bartoli et al. | ................... | 705/35 |
| 6,081,835 A * | 6/2000 | Antcliff et al. | ................ | 709/217 |
| 6,237,035 B1 * | 5/2001 | Himmel et al. | ............... | 709/224 |
| 6,922,815 B2 * | 7/2005 | Rosen | ........................... | 715/782 |
| 6,981,024 B2 | 12/2005 | Satomi et al. | | |
| 7,003,494 B2 * | 2/2006 | Beach et al. | .................... | 705/40 |
| 7,068,190 B2 | 6/2006 | Satomi et al. | | |

(Continued)

FOREIGN PATENT DOCUMENTS

JP    10-124459    5/1998

(Continued)

OTHER PUBLICATIONS

D. Lane, et al., "Web Database Applications with PHP & MySQL passage", Web Database Application with PHP and MySQL, Mar. 2002, pp. 1-26.

(Continued)

*Primary Examiner* — Firmin Backer
*Assistant Examiner* — Hamza Algibhah
(74) *Attorney, Agent, or Firm* — Fitzpatrick, Cella, Harper & Scinto

(57) ABSTRACT

A client computer can display a desired Web screen on a display by transmitting a request containing an URL address to a Web server using a Web browser. The Web server provides an instance associated with a URL address with member variable mode indicating whether a variable can be rewritten in response to a request from the Web browser. Only when member variable mode indicates that the variable can be rewritten, the Web server rewrites the variable corresponding to a request from the Web browser. On the other hand, when member variable mode indicates that the variable cannot be rewritten, the Web server does not rewrite the variable and notifies the Web browser of an error. This control can prevent the occurrence of inconsistency between the data recognized as the data which the user has input to the Web browser and transmitted to the Web server and the data actually stored in the Web server.

5 Claims, 12 Drawing Sheets

U.S. PATENT DOCUMENTS

| | | | |
|---|---|---|---|
| 7,117,255 B1 * | 10/2006 | Yamamoto et al. | 709/219 |
| 7,216,236 B2 * | 5/2007 | Kou et al. | 713/183 |
| 7,310,783 B2 * | 12/2007 | Pagan | 715/840 |
| 7,328,238 B2 * | 2/2008 | Forslund | 709/203 |
| 7,484,087 B2 * | 1/2009 | Doddington | 713/150 |
| 7,577,752 B2 * | 8/2009 | Kimura | 709/232 |
| 2002/0038337 A1 | 3/2002 | Satomi et al. | |
| 2002/0099936 A1 | 7/2002 | Kou et al. | 713/151 |
| 2003/0065585 A1 | 4/2003 | Satomi et al. | |
| 2003/0065647 A1 | 4/2003 | Satomi et al. | |
| 2003/0065807 A1 | 4/2003 | Satomi et al. | |
| 2004/0019808 A1 | 1/2004 | Devine et al. | 713/201 |
| 2004/0148339 A1 * | 7/2004 | Forslund | 709/203 |
| 2005/0004847 A1 | 1/2005 | Matsuura | |
| 2006/0031376 A1 | 2/2006 | Satomi et al. | |
| 2006/0174041 A1 | 8/2006 | Satomi et al. | |

FOREIGN PATENT DOCUMENTS

| | | |
|---|---|---|
| JP | 11-327863 | 11/1999 |
| JP | 2000-163343 | 6/2000 |
| JP | 2001-216262 | 8/2001 |
| WO | WO 02/27552 | 4/2002 |
| WO | 2004/057483 | 7/2004 |

OTHER PUBLICATIONS

J. S. Park, et al., "Secure Cookies on the Web", IEEE Internet Computing, IEEE Service Center, New York, NY, Jul. 2000, pp. 36-44.
Japanese Office Action dated Jun. 11, 2010 issued during prosecution of related Japanese application No. 2004-275031.
Japanese Office Action dated Mar. 18, 2011 issued during prosecution of related Japanese application No. 2004-275031.

\* cited by examiner

--Prior Art--

FIG. 11 —Prior Art—

SERVER APPARATUS FOR PROVIDING DISPLAY SCREEN THROUGH NETWORK, CONTROL METHOD THEREFOR, AND PROGRAM THEREFOR

FIELD OF THE INVENTION

The present invention relates to a server apparatus which performs predetermined processing while exchanging data with a client computer equipped with a browser through a network, a control method therefor, and a program therefor.

BACKGROUND OF THE INVENTION

Conventionally, online commerce services designed to accept orders for merchandise using the Internet have been available. In these online commerce services, service providers prepare Web servers. Users access the Web servers prepared by the service providers through the Internet using client computers on which Web browsers are installed, and perform e-commerce transactions by ordering merchandise and making payments.

In some case, a Web server is implemented by sharing processing associated with such an e-commerce transaction between an application server computer and a database server computer. In this specification, however, in addition to such server computers, an apparatus or an overall system which provides a predetermined service or implements predetermined processing by exchanging data with a client computer equipped with a Web browser in accordance with HTTP (Hyper Text Transfer Protocol) will be called Web servers.

The Web browser installed on a client computer used by a user is not designed to be connected to a specific Web server, and operates independently of any Web server. For this reason, a Web server can rarely know the state on the Web browser (for example, which screen is displayed on the display of a client computer).

A Web browser is provided with functions like "back" and "forward" which are used to access Web pages, displayed in the past, in chronological order, and a function of opening a new window of which contents is the same as that of a window which has been focused (e.g., "open this page in new window" function). These functions are implemented when the Web browser uses data cached in the storage unit of the client computer. Therefore, the Web browser makes no new request to the Web server. This makes it more difficult for the Web server to know which kind of Web page is displayed on the Web browser.

In addition, the existence of various types of Web browsers which operate differently makes the situation more complicated. Consider, for example, the execution of the function "back". In this case, some Web browsers generate no new requests to Web servers which display pages while other Web browsers do generate requests. In addition, even when the windows displayed on displays are changed in size, some Web browsers generate new requests to Web servers.

In such an environment in which various types of Web browsers coexist, problems may occur when a proprietary function of a specific Web browser is used. That is, the data transmitted by a user from a Web browser may become inconsistent with the data stored in a Web server as a result of this transmission (or the processing intended by the user may become inconsistent with the processing result obtained by the Web server).

A specific example in which the state on the Web server side becomes inconsistent with the state on the Web browser side of a client computer will be described below with reference to FIGS. 11 and 12.

FIG. 11 is a view schematically showing changes in screens displayed on a Web server which provides a online commerce service and on a Web browser connected to the Web server.

Screens B1101 to B1104 are examples of screens displayed on the Web browser by the exchange of data between the Web server and the Web browser along with the progress of a transaction. The screens B1101 to B1104 are identical to the screens shown in enlargement in FIGS. 3 to 6 (to be described later), respectively.

When a user selects a product by pressing a purchase button P302 for the product displayed in the product selection screen B1101 (FIG. 3) (This indicates pressing a button on a GUI by, for example, clicking a pointing device or pressing the "Enter" key on a keyboard. The same applies to the following description), the Web browser generates a request to the URL assigned to the purchase button P302.

An instance D1101 on the Web server corresponding to this URL issues a unique session ID, and generates an instance D1102 in the memory of the Web server. At this time, the session ID issued by the instance D1101 is stored in member variable session_id of the instance D1102. The instance D1102 transmits the orderer input screen B1102 (FIG. 4) to the Web browser.

The user inputs his/her name and address to text fields P401 and P402 with, for example, the keyboard, and presses an "OK" button P404. In response to this operation, the Web browser generates a request with the information of the name and address to the URL assigned to the "OK" button P404.

The instance D1102 is associated with this URL. The instance D1102 receives the information of the address and name, and performs processing like that shown in the flowchart of FIG. 12.

The instance D1102 stores the name in member variable name, and the address in member variable address (S1201). In addition, an instance D1103 is generated (S1202). The newly generated instance D1103 is stored in member variable next of the instance D1102 (S1203). The same data as those of the instance D1102 are stored in member variables session_id, name, and address of the instance D1103 (S1206).

The instance D1102 is stored in member variable prev of the instance D1103 (S1207). The instance D1103 transmits the input information confirmation screen B1103 (FIG. 5) to the Web browser (S1208).

When the user presses a "confirm" button P504 upon confirming a name P501 and address P502 displayed in the confirmation screen B1103, the Web browser generates a request to the URL which is associated with the "confirm" button P504. The instance D1103 is associated with this URL. The instance D1103 stores order content and the name and address of the orderer in a DB (database), and instructs the Web browser to redirect them to a screen B1101a (FIG. 3).

When an error occurs at the time of storing values in member variables or a DB, an instance D1104 is newly generated, and the error display screen B1104 (FIG. 6) is transmitted to the Web browser. Although an error code (err001) is displayed in P601 of the screen B1104, a message which is easy for the user to understand may be displayed. Instead of dynamic display of an error code, a static error page (remaining the same regardless of error contents) may be displayed. In this case, the instance D1104 does not exist, transition to the screen B1104 as a static page is made by redirecting using the function of the Web browser.

When a "back" button P505 is provided for the confirmation screen B1103 (FIG. 5) independently of the "back" function of the Web browser, member variable prev is needed in the instance D1103. When the button P505 is pressed, it is possible to transmit the preceding input screen B1102 to the Web browser by using the instance D1102 stored in member variable prev.

Likewise, member variable next exists in the instance D1102. When the user presses the "OK" button P404 in the re-displayed input screen B1102, the instance D1102 can acquire the instance D1103 by using member variable next, set member variables name and address of the instance D1103, and transmit the screen B1103 to the Web browser. This makes it possible for the Web server to quickly implement screen transition without generating any new instance for each screen transition and suppress the memory consumption to a low level.

Note that in the above case, the product selection screens (B1101 and B1101a) are static pages. However, the following problems arise even if the screens B1101 and B1101a are dynamic pages. In addition, in the above case, a description of screens associated with payment such as a credit card number input screen is omitted. But the following problems arise in such screens.

Note that in practice, it is general to separately prepare a screen for inputting a quantity and delivery destination by preparing a member variable indicating a product and a member variable for storing a quantity and transferring a product ID and the like from the instance D1101 instead of generating an instance specialized for a product as in this case.

Note that in this case, a session ID is generated in the instance D1101 and is stored in the member session_id of the instances D1102 and D1103. Containing the session ID in the URL and associating the instances D1102 and D1103 with the URL make it possible to suppress the memory consumption due to screen transition and allow a plurality of users to purchase identical products at the same time. Such a technique of maintaining one process in the form of session is currently generally used. Generally, a Web server which requires login issues a session ID to each Web browser at the time of login and maintains the session until logout or timeout.

The process described with reference to FIGS. 11 and 12 is a simplified example of a process conventionally used for online commerce. In this process, when a function of Web browsers is used, the Web server cannot know the state of the Web browser. Consequently, the operation performed by the user with the Web browser may become inconsistent with the resultant data stored in the Web server.

A case wherein the following inconsistency occurs will be described below.

Assume that in the above process, the orderer input screen B1102 is being displayed on the Web browser, and the orderer input screen B1102 is being displayed in a window A01 of the Web browser. Assume that the user checks the URL of the orderer input screen B1102, opens another Web browser, and let the newly opened Web browser display the same URL. Assume that this new window is denoted by reference symbol A02.

As a consequence, the identical orderer input screens B1102 are displayed in the different windows, i.e., the windows A01 and A02. Since the screens B1102 displayed in the two windows A01 and A02 are associated with the same URL, identical screens are displayed.

Note that the Web server can be designed to make transition to an error screen upon receiving two or more requests for the same URL, thereby inhibiting the Web browser from displaying identical screens. As described above, however, some Web browser generates a request to the same URL even when only the size of a displayed window is changed. This makes it impossible to perform such control to prevent the generation of repetitive requests to the same URL.

When, first of all, the user inputs his/her name and address through the orderer input screen B1102 displayed in the window A01 and presses the "OK" button P404, the Web server performs the processing in steps S1201 to S1208 shown in FIG. 12 described above. As a result, the name and addresses are respectively stored in member variables name and addresses in each of the instances D1102 and D1103, and the input confirmation screen B1103 is displayed in the window A01. The name and address displayed in the input confirmation screen B1103 are input through the input screen B1102 displayed in the window A01.

Subsequently, the user inputs his/her name and address through the window A02 in which the orderer input screen B1102 is being displayed, and presses the "OK" button P404 in the screen B1102. The windows A01 and A02 are each associated with the same instances D1102 and D1103. For this reason, the name and address input through the screen in the window A02 are overwritten on member variables name and address in each of the instances D1102 and D1103. The screen B1103 is displayed in the window A02. The name and address displayed here are input through the screen B1102 in the window A02.

In this state, the contents displayed in the input confirmation screen B1103 displayed in the window A01 are not updated. Therefore, the data input through the window A01 (the data before being overwritten by the data input through the window A02) is kept displayed. Even if the user trusts the display in the window A01 and presses the "confirm" button P504, the instance D1103 stores a value different from that recognized by the user in the DB. More specifically, the name and address input through the orderer input screen B1102 displayed in the window A02, overwritten on member variables name and addresses of the instance D1103, are stored in the DB.

When the "confirm" button P504 in the input confirmation screen B1103 displayed in the window A02 is pressed, the name and address input through the window B1102 are stored in the DB in the same manner as described above. Even if a customer intends to make different orders by inputting different names and addresses through the windows A01 and A02, the orderer information input later is stored in the DB. As a consequence, two identical orders are generated.

SUMMARY OF THE INVENTION

The present invention has been made to solve such problems, and has as its object to prevent the occurrence of inconsistency between the data recognized as the data which a customer has input to a Web browser and transmitted to a Web server and the data actually stored in the Web server.

According to an aspect of the present invention, there is provided a data providing apparatus which provides a screen in response to an address acquired from an external communication terminal through a network, comprising: storing means for storing rewrite information, which indicates whether a predetermined variable can be rewritten, in correspondence with an address received from the external communication terminal; reception means for receiving a rewrite request for a predetermined variable corresponding to an address received from the external communication terminal; discrimination means for discriminating whether the requested predetermined variable can be rewritten, by accessing rewrite information stored in the storing means; and rewrite means for rewriting the predetermined variable in accordance with a discrimination result obtained by the discrimination means on the basis of a request received by the reception means.

According to another aspect of the present invention, there is provided a control method for a data providing apparatus which provides a screen in response to an address acquired from an external communication terminal through a network, comprising: a storing step of storing rewrite information, which indicates whether a predetermined variable can be rewritten, in correspondence with an address received from the external communication terminal; a reception step of receiving a rewrite request for a predetermined variable corresponding to an address received from the external communication terminal; a discrimination step of discriminating whether the requested predetermined variable can be rewritten, by accessing rewrite information stored in the storing step; and a rewrite step of rewriting the predetermined variable in accordance with a discrimination result obtained in the discrimination step on the basis of a request received in the reception step.

According to another aspect of the present invention, there is provided a program for causing a computer to implement a control method for a data providing apparatus which provides a screen in response to an address acquired from an external communication terminal through a network, comprising: a storing step of storing rewrite information, which indicates whether a predetermined variable can be rewritten, in correspondence with an address received from the external communication terminal; a reception step of receiving a rewrite request for a predetermined variable corresponding to an address received from the external communication terminal; a discrimination step of discriminating whether the requested predetermined variable can be rewritten, by accessing rewrite information stored in the storing step; and a rewrite step of rewriting the predetermined variable in accordance with a discrimination result obtained in the discrimination step on the basis of a request received in the reception step.

With this arrangement, according to the present invention, it is possible to prevent the occurrence of inconsistency between the data recognized as the data which a customer has input to a Web browser and transmitted to a Web server and the data actually stored in the Web server.

Other objects and advantages besides those discussed above shall be apparent to those skilled in the art from the description of a preferred embodiment of the invention which follows. In the description, reference is made to accompanying drawings, which form a part thereof, and which illustrate an example of the various embodiments of the invention. Such example, however, is not exhaustive of the various embodiments of the invention, and therefore reference is made to the claims which follow the description for determining the scope of the invention.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
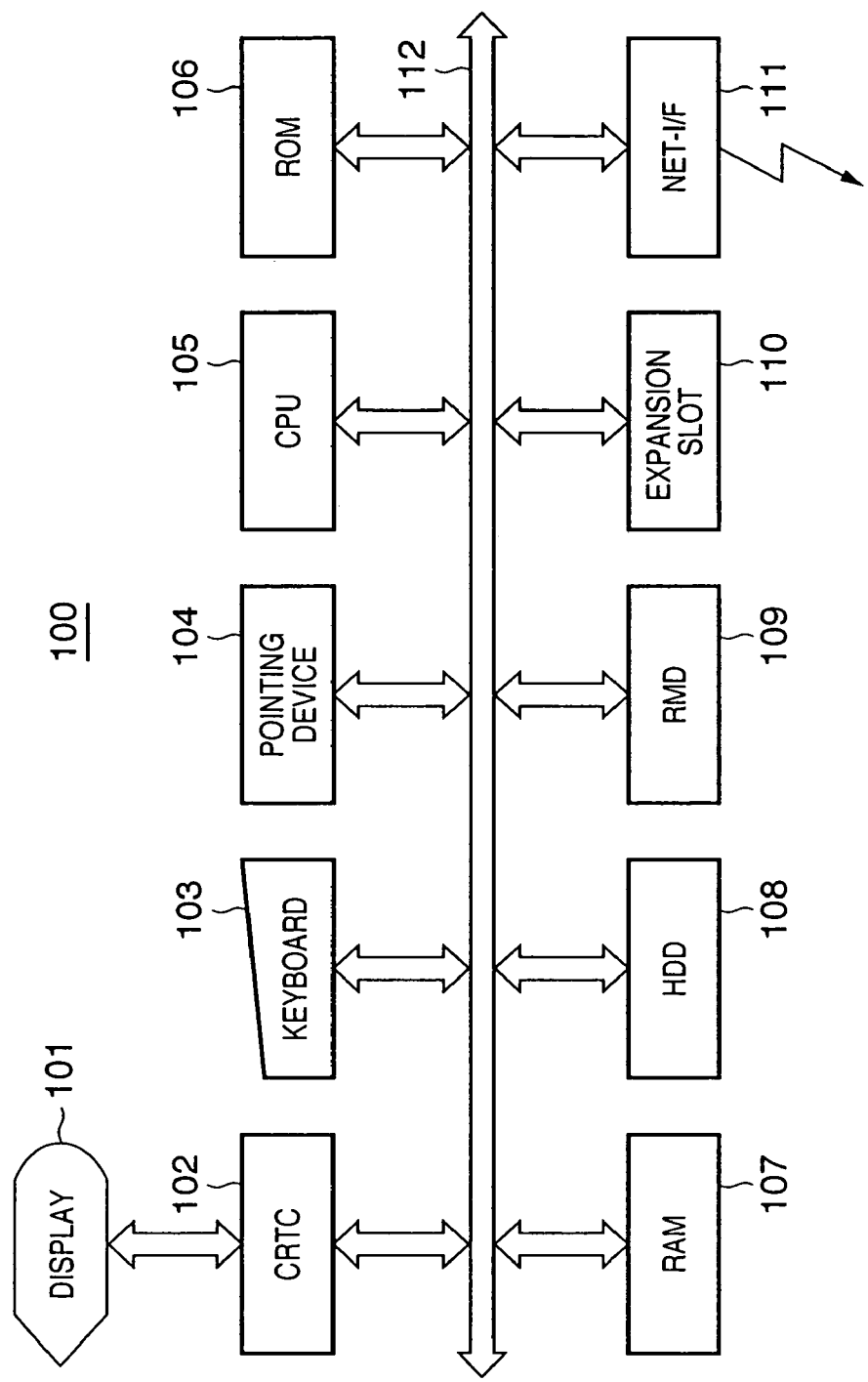
FIG. 1 is a block diagram showing an example of the arrangement of a computer apparatus which can be used as a Web server and an information processing apparatus which implements a Web browser in this embodiment.

FIG. 1 is a block diagram showing an example of the arrangement of a computer apparatus which can be used as a Web server and an information processing apparatus which implements a Web browser in this embodiment.

Referring to FIG. 1, a display 101 displays the information of data which is being processed by an application program, various kinds of message menus, and the like, and comprises a CRT (Cathode Ray Tube), LCD (Liquid Crystal Display), or the like. A CRTC 102 serving as a video RAM (VRAM) display controller performs screen display control on the display 101. A keyboard 103 and pointing device 104 are used to, for example, input characters and the like and designate icons, buttons, and the like in a GUI (Graphical User Interface). A CPU 105 controls the overall computer apparatus.

A ROM (Read Only Memory) 106 stores programs executed by the CPU 105, parameters, and the like. A RAM (Random Access Memory) 107 is used as a work area which is used when the CPU 105 executes various kinds of programs, a temporary save area used at the time of error processing, and the like.

A hard disk drive (HDD) 108 and removable media drive (RMD) 109 function as external storage devices. The removable media drive is a device which reads/writes information from/on or reads it from a detachable recording medium, and may be a detachable HDD as well as a flexible disk drive, optical disk drive, magnetoopitcal disk drive, or memory card reader.

Note that in this embodiment, an OS, application programs such as a Web browser, data, libraries, and the like are stored in accordance with uses, in addition to programs which implement the various functions of the Web server described in this embodiment. More specifically, they are stored in one or more of the recording media including the ROM 106, HDD 108, and RMD 109.

An expansion slot 110 is an expansion card mounting slot conforming to, for example, the PCI (Peripheral Component Interconnect) bus standard, in which various kinds of expansion boards such as a video capture board, sound board, and GPIB board can be mounted.

A network interface 111 is an interface for connecting the computer apparatus to a computer network. A bus 112 comprises an address bus, data bus, and control bus, which connect the units described above. This apparatus also includes serial interfaces such as RS-232C, RS-422, USB (Universal Serial Bus), and IEEE 1394 and parallel interfaces such as IEEE 1284, in addition to the network interface 111. This makes it possible to connect external devices such as a modem and printer.

Such a general-purpose computer apparatus can communicate with other devices on a computer network and public switched telephone network by using an OS, necessary driver software, and the like. For this communication, external devices may be used, including a router (including a dial-up router) connected to the apparatus as needed through the network interface 111 and a modem or TA which is connected through a serial interface.

Note that, as described above, the Web server in this embodiment may be an apparatus or system, including an application server and database server, which exchange data with a Web browser operating on a client computer in accordance with a protocol such as HTTP. It is therefore not necessary that this apparatus comprise one device like that shown in FIG. 1. It is rather general and practical that a plurality of computers be used and made to have the functions of an HTTP server, application server, database server, and file server, respectively, so as to implement the function of a Web server as a whole.

In this specification, an instance generated by the Web server is, for example, a constituent element of an application which implements the function of the Web server. When the present invention is implemented by using an object oriented language, an instance is synonymous with that in an object oriented programming language such as JAVA (registered tradename), C++, or Small Talk.

Note that a class in an object-oriented language is comprised of a member variable and a method of handling the member variable. Only when a class is constructed to ensure an area in the memory, a value can be stored in the member variable, and the method of handling the member variable can be used. An object obtained by constructing a class in this manner is an instance.

The present invention can be implemented by using a object-oriented or non-object-oriented programming language other than the above object-oriented programming language. Most generally, however, an object-oriented programming language is used, and this specification is described by using the concept "instance" because the relationship with screens can be easily explained.

Even if any object-oriented programming language is not used, the present invention can be implemented as long as a session exists and a memory area corresponding to a screen exists in a RAM. The use of an object-oriented programming language is not therefore an essential condition for the present invention.

That is, an "instance" described in this specification means an instance in an object-oriented programming language when the object-oriented programming language is used to implement the present invention. If, however, a language other than object-oriented programming languages is used, an instance means a memory area corresponding to a screen and subroutines which access the memory area. More specifically, in this embodiment, an instance generated by the Web server functions as a data transmission means for causing a Web browser to display a predetermined screen and a means which receives a request generated from the Web browser by operation in the screen (pressing a button in a display screen, link clicking, or equivalent operation, which is not operation with respect to the GUI of the browser) and performs processing corresponding to the received request.

Figure 2:
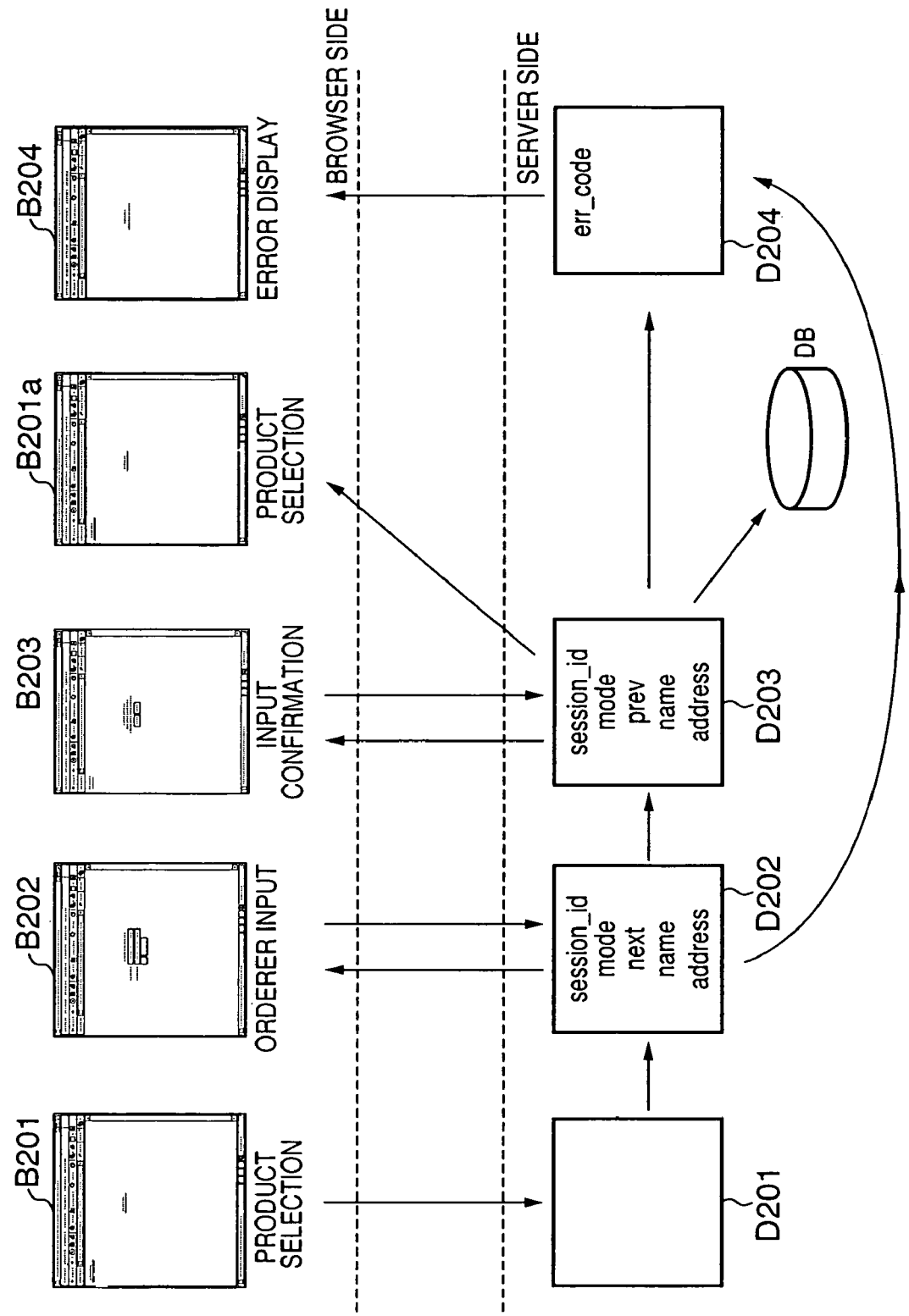
FIG. 2 is a view schematically showing a simplified process performed between the Web browser and the Web server according to the first embodiment of the present invention.

FIG. 2 is a view schematically showing a process executed by the Web server and Web browser according to this embodiment.

Note that a characteristic feature of this embodiment is that member variable mode is added to each of instances D1102 and D1103.

In a product selection window B201 (FIG. 3) displayed on the Web browser, the user presses a purchase button P302 corresponding to a given product by using the keyboard 103 or pointing device 104. In response to this, the Web browser generates a request to the URL assigned to the purchase button P302. An instance D201 of the Web server which is associated with this URL issues a unique session ID, and generates an instance D202 on a memory (e.g., the RAM 107). Subsequently, "true" is stored in member variable mode of the instance D202, and the session ID issued by the instance D201 is stored in member variable session_id.

The instance D202 transmits HTML data or the like for displaying an orderer input screen B202 to the Web browser. The Web browser then renders the received data and displays the orderer input screen B202. The following description that an instance generated by the Web server causes the Web browser to display a screen means the operation of transmitting data for screen display from the instance and causing the Web browser to interpret the data and display it upon rendering.

The user inputs his/her name and address to text fields P401 and P402 in the orderer input screen B202 by using the keyboard 103 and presses an "OK" button P404. In response to this operation, the Web browser adds the information of the name and address to the URL assigned to the "OK" button P404 and issues a request to the Web server. The instance D202 is associated with this URL.

Processing in the instance D202 of the Web server which has received this request will be described with reference to the flowchart of FIG. 7.

First of all, the instance D202 checks whether member variable mode of its own is "true" (S720). If member variable mode is "true", the name and address sent from the Web browser are stored in member variables name and address, respectively (S701). It is then checked whether member variable next is "null" (S730).

At this point of time, since no information is stored in member function next and "null" is set, the instance D203 is generated (S702). The newly generated instance D203 is stored in member variable next of the instance D202 (S703). Subsequently, "false" is stored in member variable mode of the instance D202 (S704), and "true" is stored in member variable mode of the instance D203 (S705).

The same values as those of the corresponding member variables of the instance D202 are stored in member variables session_id, name, and address of the instance D203 (S706).

Figure 5:
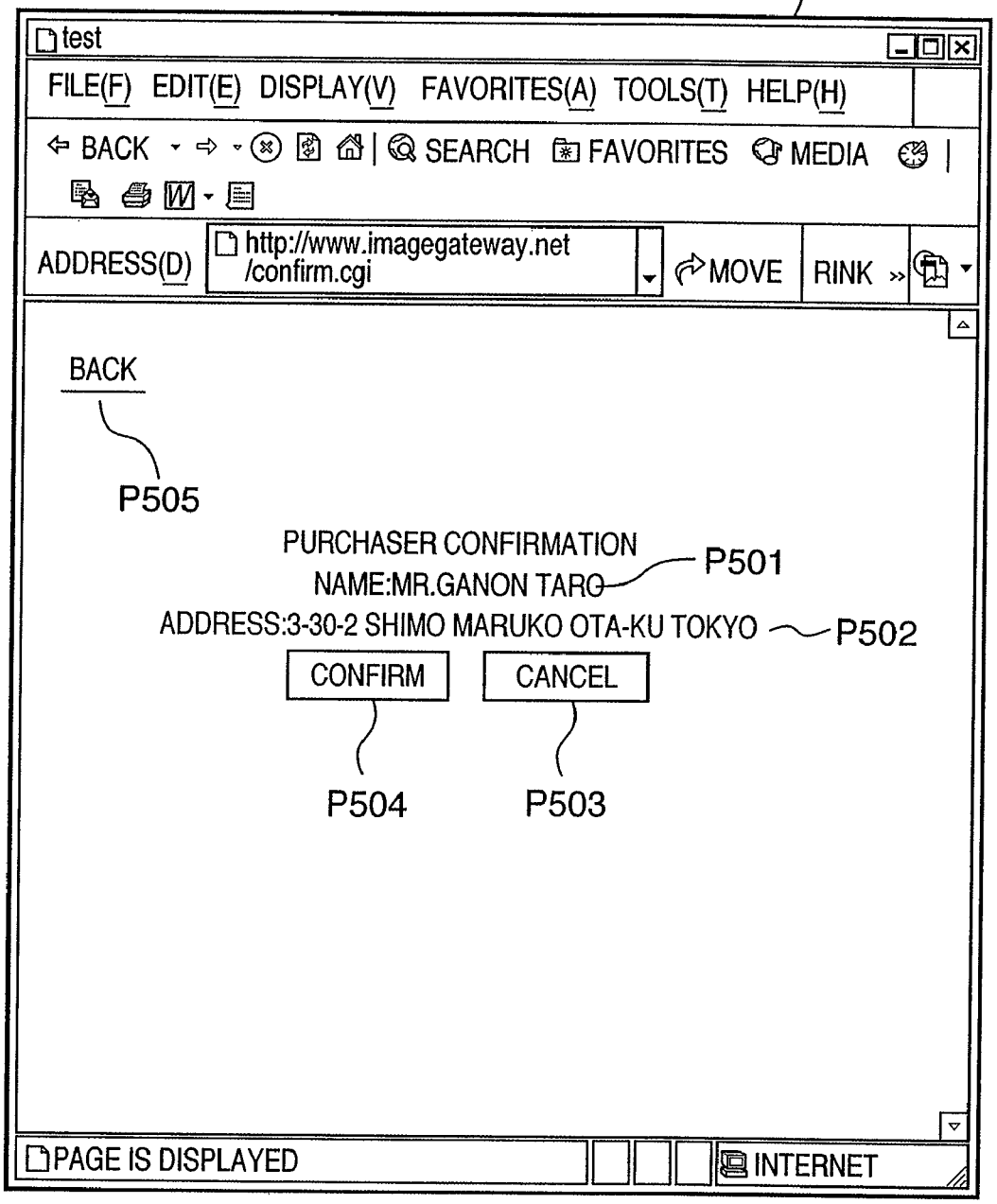
FIG. 5 is a view showing an example of an orderer information confirmation screen displayed on the Web browser.

The instance D202 is stored in member variable prev of the instance D203 (S707). The control is then transferred to the instance D203 (the instance D203 causes the Web browser to display an input confirmation screen B203 (FIG. 5)) (S708).

When the user presses a "confirm" button P504 upon confirming a name P501 and address P502 displayed in the input confirmation screen B203, the Web browser generates a request to the URL associated with the "confirm" button P504. The instance D203 is associated with this URL. Upon receiving the request, the instance D203 checks whether member variable mode of its own is "true".

Figure 3:
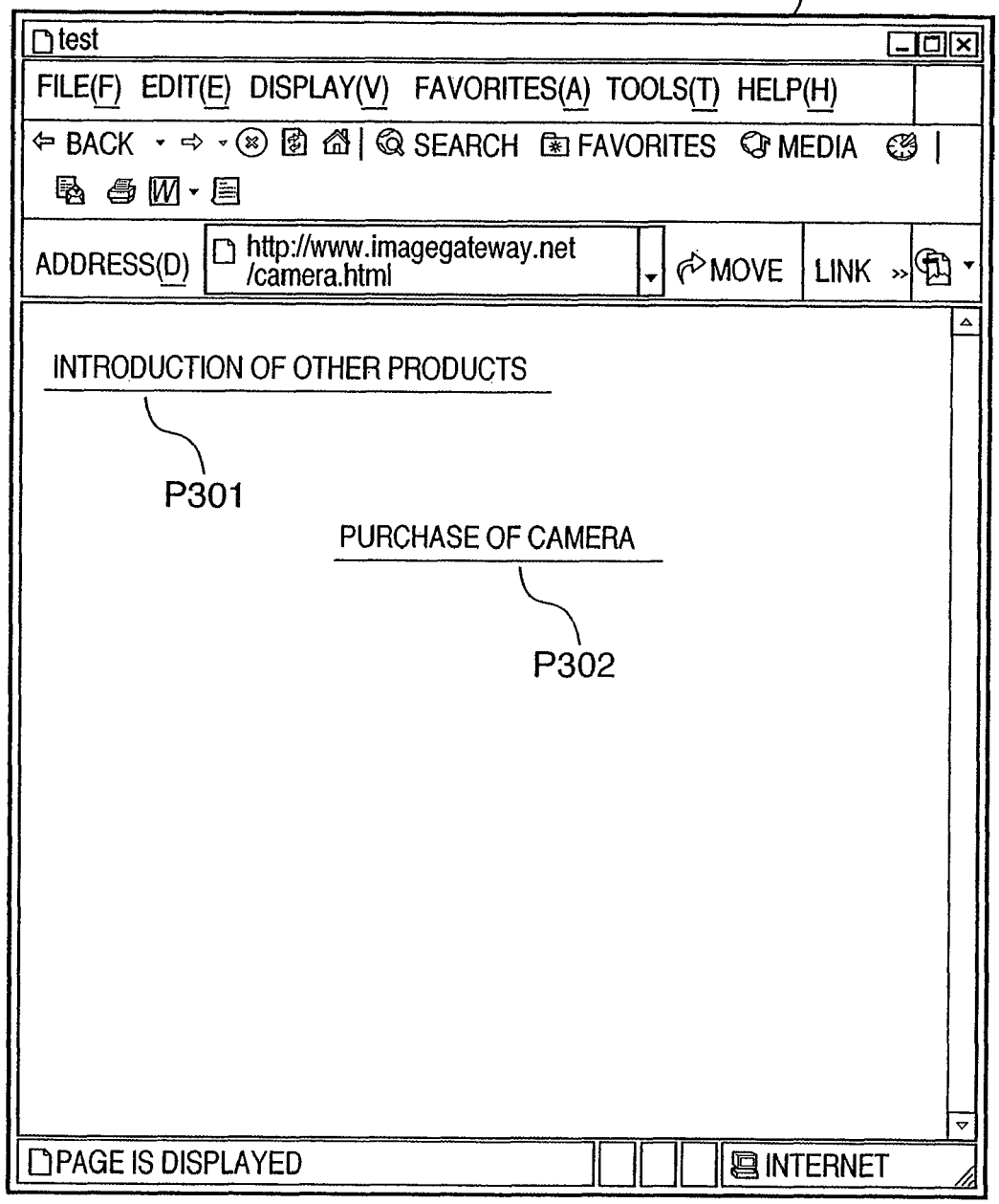
FIG. 3 is a view showing an example of a product selection screen displayed on the Web browser.
Figure 4:
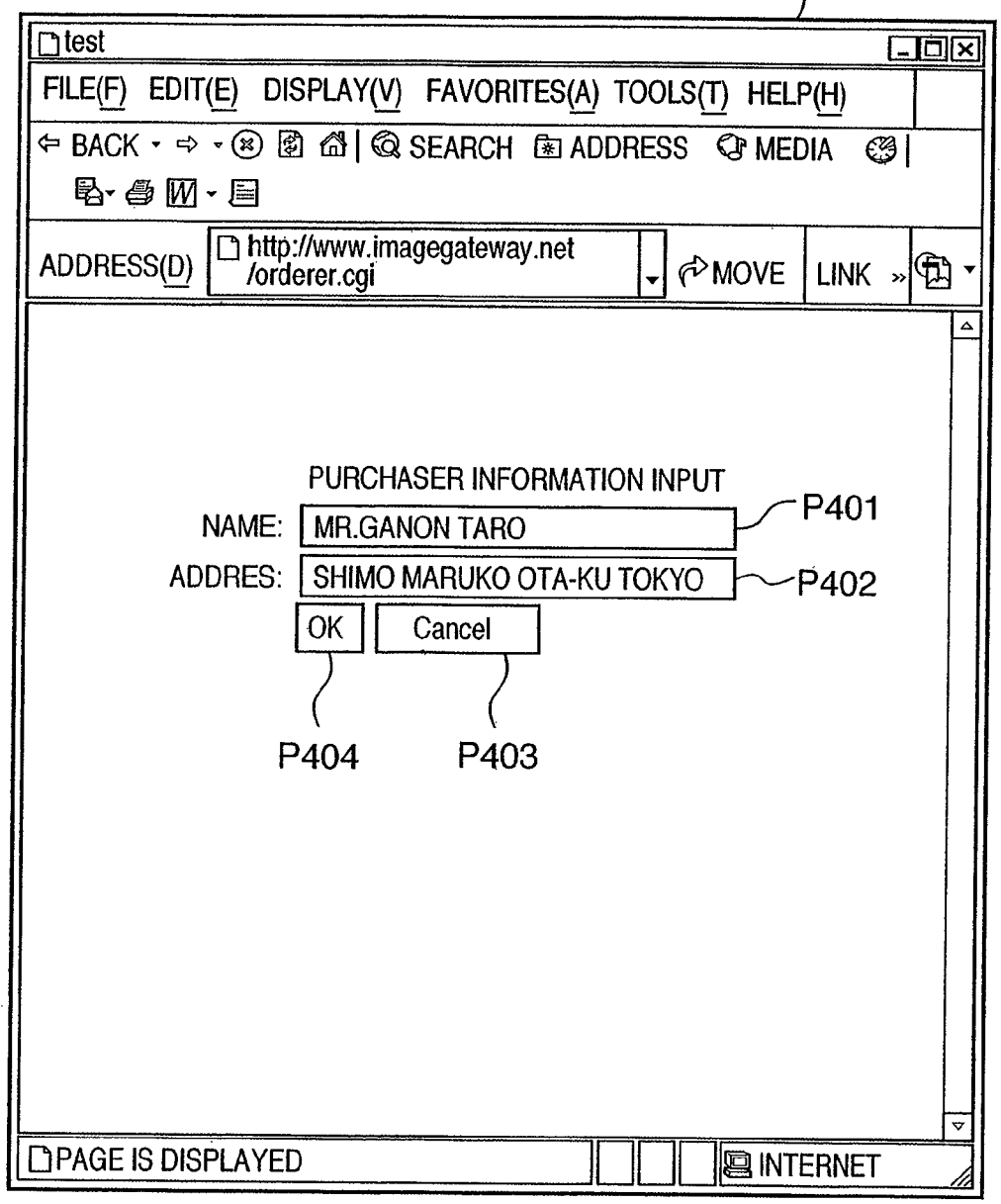
FIG. 4 is a view showing an example of an orderer input screen displayed on the Web browser.

If member variable mode is "true", the order contents (a product code, quantity, and the like), name, and address are stored in the DB, and "false" is stored in member variable mode. The Web browser is instructed to redirect them to a product selection screen B201a (FIG. 3). This embodiment exemplifies the simplest case of product ordering operation. Assume therefore that order contents are uniquely determined by pressing the purchase button P302 in the product selection window B201, and the instance D203 is specialized for the order contents.

A plurality of products can be handled by adding member variables storing product contents (product codes, quantities, and the like) to the instances D202 and D203 and setting member variables of the instance D202 from the instance D201, and member variables of the instance D203 from the instance D202. In this specification, simple product ordering operation is described as an embodiment for the sake of easy understanding of the present invention. Obviously, however, the present invention can be applied to more complicated and practical ordering forms.

Figure 6:
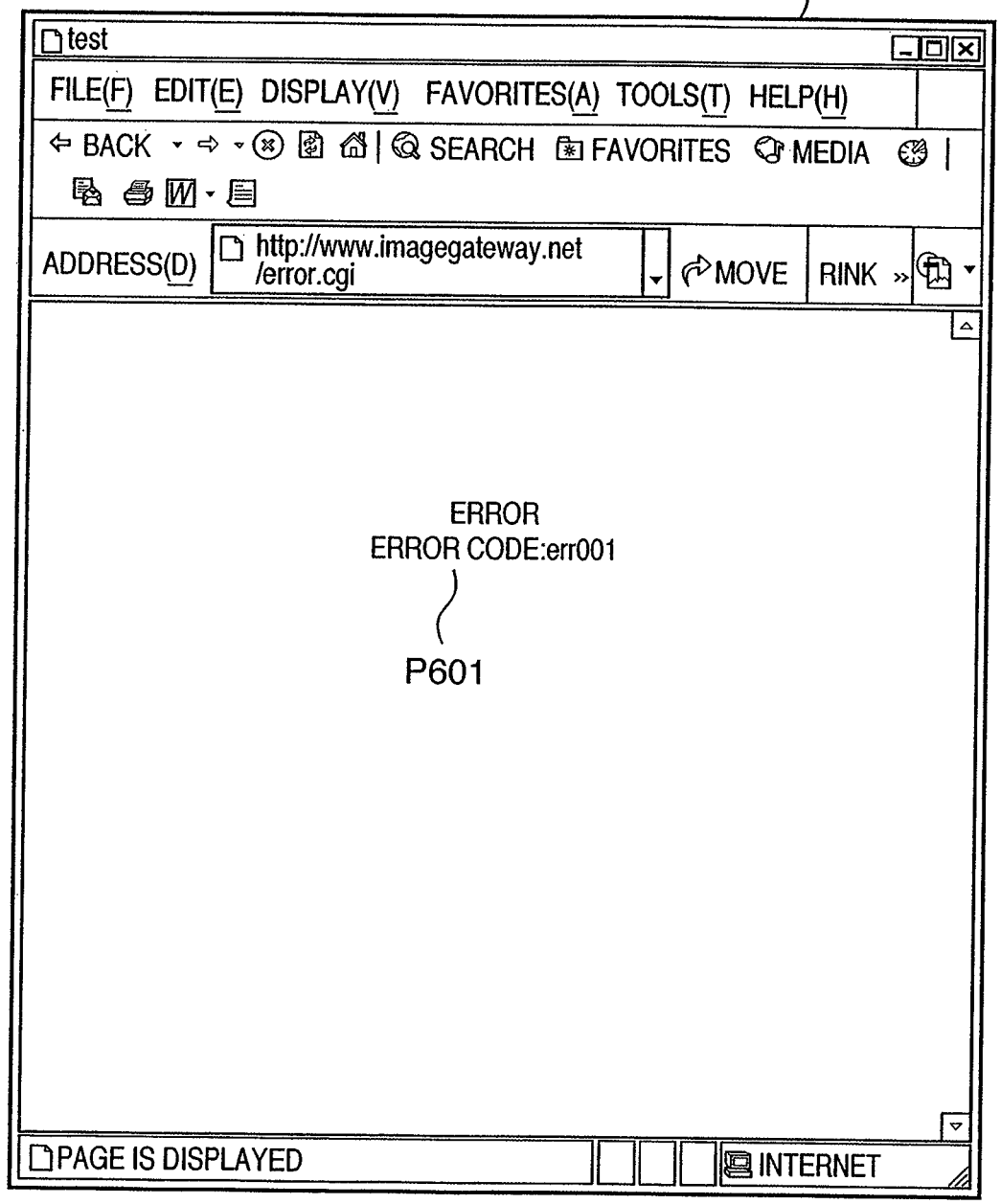
FIG. 6 is a view showing an example of an error screen displayed on the Web browser.
Figure 7:
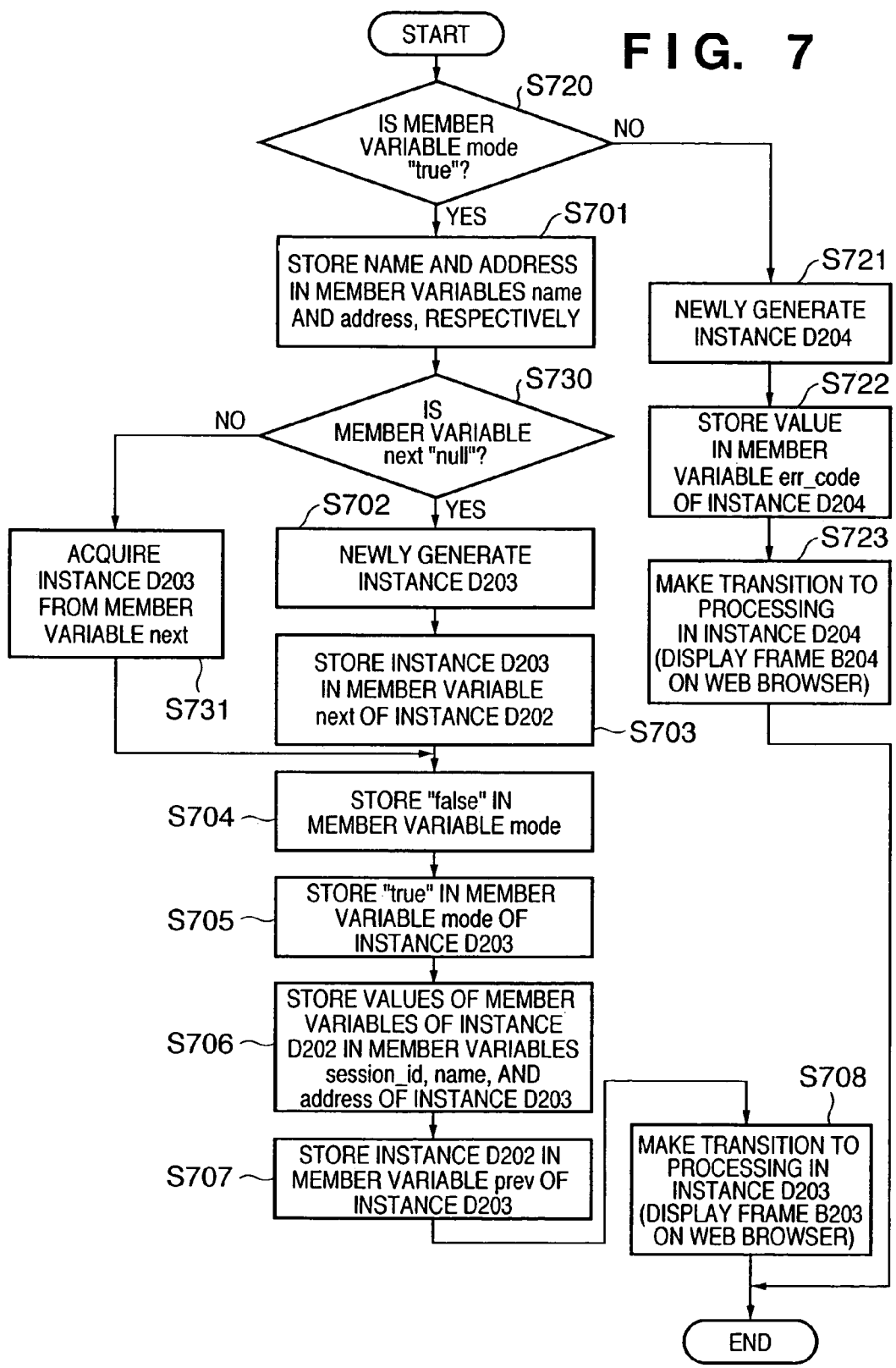
FIG. 7 is a flowchart for explaining processing in an instance D202 in the first embodiment.

If the Web server determines, in step S720 in FIG. 7, that member variable mode of the instance D202 is "false", when receiving the request generated by the Web browser in response to the pressing of the "OK" button P404 in the orderer input screen B202, the Web server newly generates an instance D204 (S721). A value (error code) is stored in member variable err_code of the instance D204 (S722). The instance D204 causes the Web browser to display an error screen B204 (FIG. 6) (S723).

When the other error occurs in the instances D202 and D203 when values to be stored in the member variables are received from the Web browser, this error can be handled in the same manner as described above. Such an error includes, for example, an error that occurs when values are stored in member variables member and address or the DB. In this case, the Web server newly generates the instance D204, and a value is stored in member variable err_code of the instance D204. The instance D204 causes the Web browser to display the error screen B204.

An error code P601 is displayed in the error screen B204. In general, however, a message which is easy for the user to understand is displayed. Instead of dynamic display of an error code, a static error page may be displayed. In this case, the instance D204 is not generated, and transition to the error screen as a static page is made by redirecting using the function of the Web browser.

Assume that the input confirmation screen B203 (FIG. 5) is provided with a "back" button P505 as a function other than the above browser functions. In this case, when the button P505 is pressed, the Web browser generates a request to the Web server with respect to the URL assigned to the button P505.

The instance D203 associated with this URL can transfer the control to the instance D202 by using the instance D202 stored in member variable prev of the instance D203. The instance D202 can cause the Web browser to display the orderer input screen B202.

Figure 8:
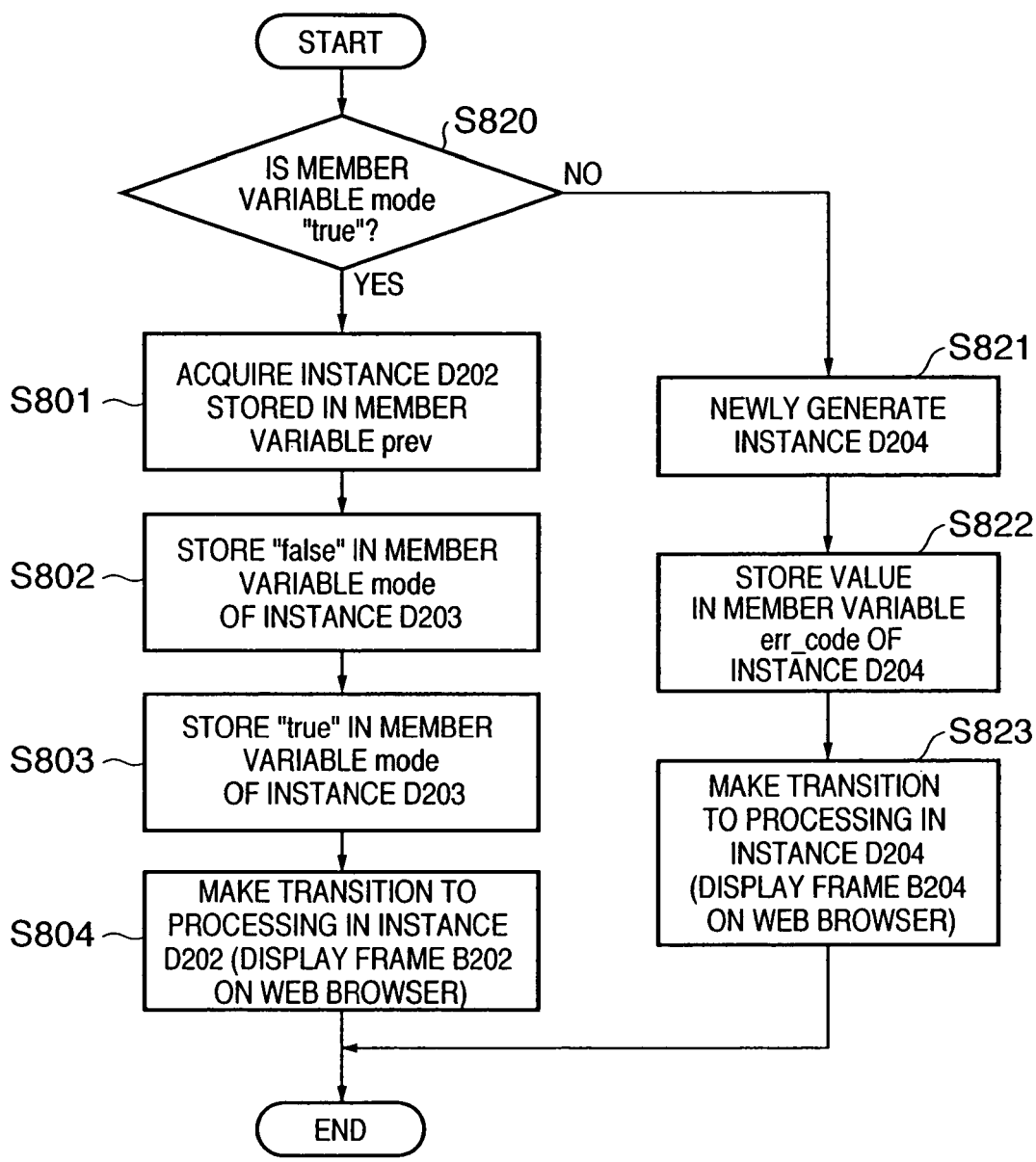
FIG. 8 is a flowchart for explaining processing in an instance D203 in the first embodiment.

Processing in the instance D203 at the time of screen transition from the input confirmation screen B203 to the orderer input screen B202 by using the "back" button P505 will be described with reference to the flowchart of FIG. 8.

The instance D203 checks whether member variable mode is "true" (S820). If member variable mode is "true", the instance D202 stored in member variable prev is acquired (S801). Subsequently, "false" is stored in member variable mode of the instance D203 (S802), and "true" is stored in member variable mode of the instance D202 (S803). With this operation, the control is transferred to the instance D202 (the instance D202 causes the Web browser to display the screen B202) (S804).

If it is determined in step S820 that member variable mode of the instance D203 is "false", an instance D204 is newly generated first (S821). A value is then stored in member variable err_code of the instance D204 (S822). The control is transferred to the instance D204 (the instance D204 causes the Web browser to display the screen B204) (S823).

When the user presses the "OK" button P404 in the displayed orderer input screen B202 after the input confirmation screen B203 is displayed, the instance D203 is stored in member variable next of the instance D202. This makes it possible to also display the input confirmation screen B203.

Processing in the instance D202 at this time will be described again with reference to FIG. 7. After the input confirmation screen B203 is displayed, the user inputs his/her name and address to the text fields P401 and P402 in the displayed orderer input screen B202 and presses the "OK" button P404. In response to this operation, the Web browser generates a request by adding the information of the name and address to the URL assigned to the "OK" button P404.

The instance D202 associated with this URL checks whether member variable mode of its own is "true" (S720). If member variable mode is "true", the received name and address are stored in member variables name and address, respectively (S701). Note that if no data inconsistency like that to be described later has occurred, member variable mode is "true".

In step S730, it is checked whether member variable next is "null". Since the instance D203 is stored in member variable next at this point of time, the instance D203 is acquired from member variable next (S731). Subsequently, "false" is stored in member variable mode of the instance D202 (S704), and "true" is stored in member variable mode of the instance D203 (S705). Thereafter, processing is performed in the above manner (s706,s707), and the control is transferred to the instance D203 in step S708 (the instance D203 causes the Web browser to display the screen B203) (S708).

According to this embodiment, no inconsistency occurs between the data stored in the Web server and the data held in the Web browser. That is, no inconsistency occurs between the data which the user has input to the Web browser and transmitted to the Web server and the data stored in the Web server.

This will be described by using input operation through two windows of the Web browser, which has been described in the prior art. Orderer input screens B102 are displayed in windows A11 and A12 of the Web browser.

The user then inputs his/her name and address to the orderer input screen B102 displayed in the window A11, and presses the "OK" button P404.

In this state, member variable mode of the instance D202 associated with the URL of the "OK" button P404 is "true".

The instance D202 executes steps S720, S701, S730, and S702 to S708 in FIG. 7 described above (or steps S720, S701, S730, S731, and S704 to S708). That is, member variable mode of the instance D202 is set to "false". The name and address input through the display screen in the window A11 are stored in member variables name and address of the instances D202 and D203. The instance D203 causes the Web browser to display the input confirmation screen B203 in the window A11. The name and address displayed in this screen are those which have been input through the orderer input screen B202 displayed in the window A11.

The user then inputs his/her name and address to the orderer input screen B202 displayed in the window A12, and presses the "OK" button P404. When a request at the time of input operation from the window A11 is processed, member variable mode of the instance D202 is set to "false" in step S704. In this case, therefore, the flow shifts from step S720 to step S721, in which the instance D204 causes the Web browser to display the error screen B204 in the window A12.

For this reason, when the user performs ordering operation to make different orders in the windows A11 and A12, the order from the window A12 is not accepted. The user is notified of this, together with a message like "Return to the product selection screen to make a new order". This prevents the user from making two identical orders to the Web server and allows the user to comprehend the situation.

As described above, according to this embodiment, each instance provided for screen display of the Web browser and the reception of data input through the Web browser is provided with member variable mode indicating whether the member variable in which received data is stored can be updated. Updating of the member variable with received data is permitted only when member variable mode indicates that the member variable can be updated. This makes it possible to prevent the occurrence of inconsistency between the data stored in the Web server and the data held by the Web browser, i.e., inconsistency between the data recognized as the data which the user has input to the Web browser and transmitted to the Web server and the data stored in the Web server.

In addition, when data to be stored in a member variable is received from the Web browser while member variable mode indicates the inhibition of updating, notifying the user of the corresponding information makes it possible to make the user clearly comprehend that intended operation has not been performed.

Second Embodiment

In the first embodiment, the present invention is applied to the arrangement designed to update a member variable of each instance provided for screen display with data received from the Web browser. In the second embodiment, the present invention is applied to an arrangement designed to cause a shared instance to update a member variable of a common instance in accordance with data received from a Web browser. This will be described with reference to FIG. 9.

Figure 9:
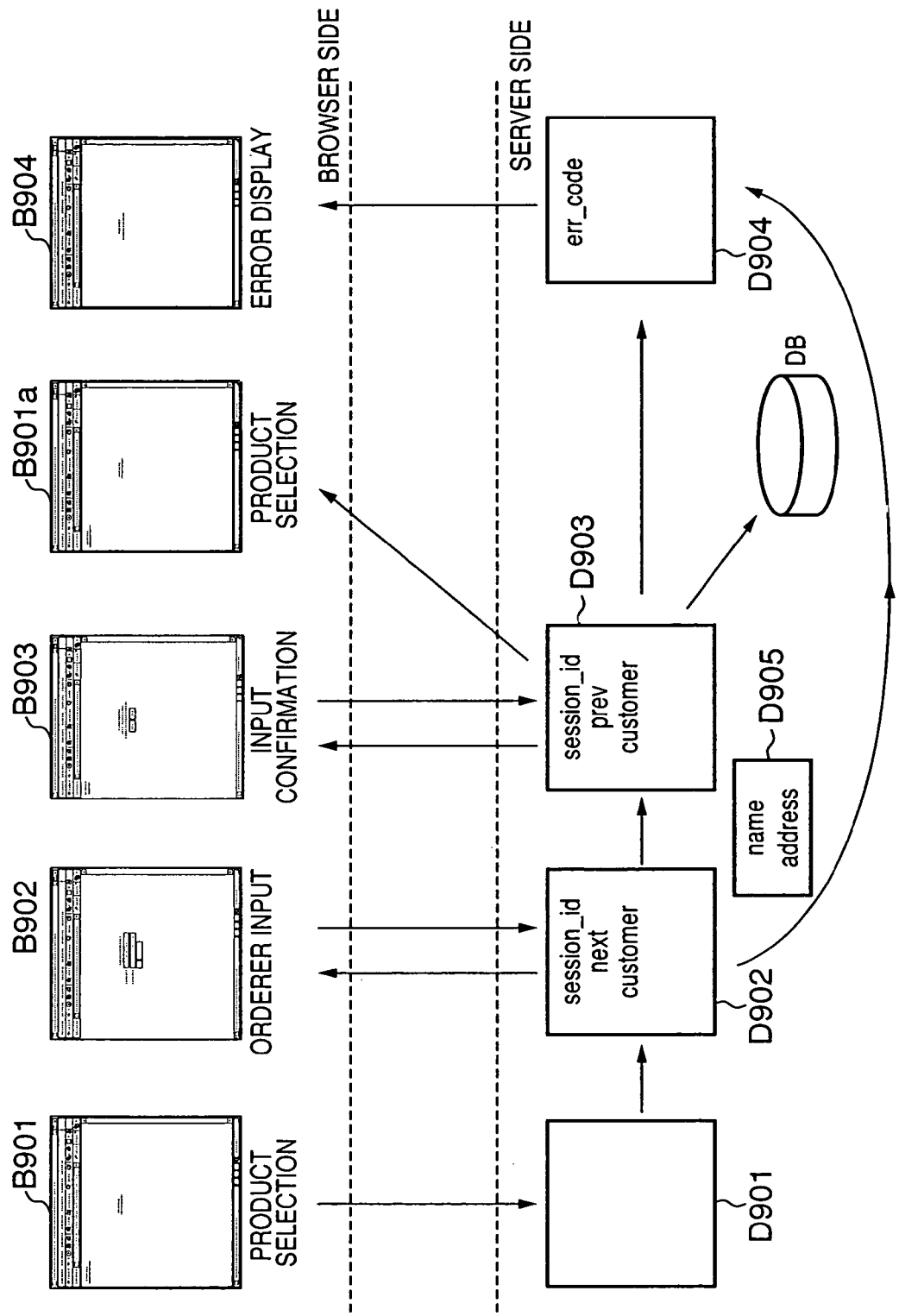
FIG. 9 is a view showing an example of another form of the process shown in FIG. 11.

As shown in FIG. 9, the Web server prepares an instance D905 which can be accessed and updated by both instances D902 and D903 and can set member variables name and address as member variables of the instance D905. This makes it possible for the Web server to omit the processing (step S706) for storing the values of member variables name and address of the instance D902 in member variables name and address of the instance D903 after the instance D903 is generated.

That is, in generating the instance D902, the Web server generates the instance D905 and stores the instance D905 in member variable customer of the instance D902. When the name and address of a user are to be updated, member variables name and address of the instance D905 stored in member variable customer are updated. In generating the instance D903, the Web server stores the instance D905 in member variable customer of the instance D903 in the same manner as in the case wherein the instance D905 is stored in member variable customer of the instance D902.

In addition, the instance D905 is an instance which has member variables name and address and is updated from a plurality of instances (D902 and D903).

In this embodiment, the Web server adds member variable mode to each of the instances D902 and D903 and permits to update member variables name and address of the instance D905 from the instance D902 only when member variable mode of the instance D902 is "true". When member variable mode of the instance D902 is "false", the Web server does not permit to update member variables name and address of the instance D905 from the instance D902.

In addition, the Web server permits to update member variables name and address of the instance D905 from the instance D903 only when member variable mode of the instance D903 is "true". When member variable mode of the instance D903 is "false", the Web server does not permit to update member variables name and address of the instance D905 from the instance D903.

This makes it possible to perform the same control as in the first embodiment, thus obtaining the same effects.

Third Embodiment

Figure 10:
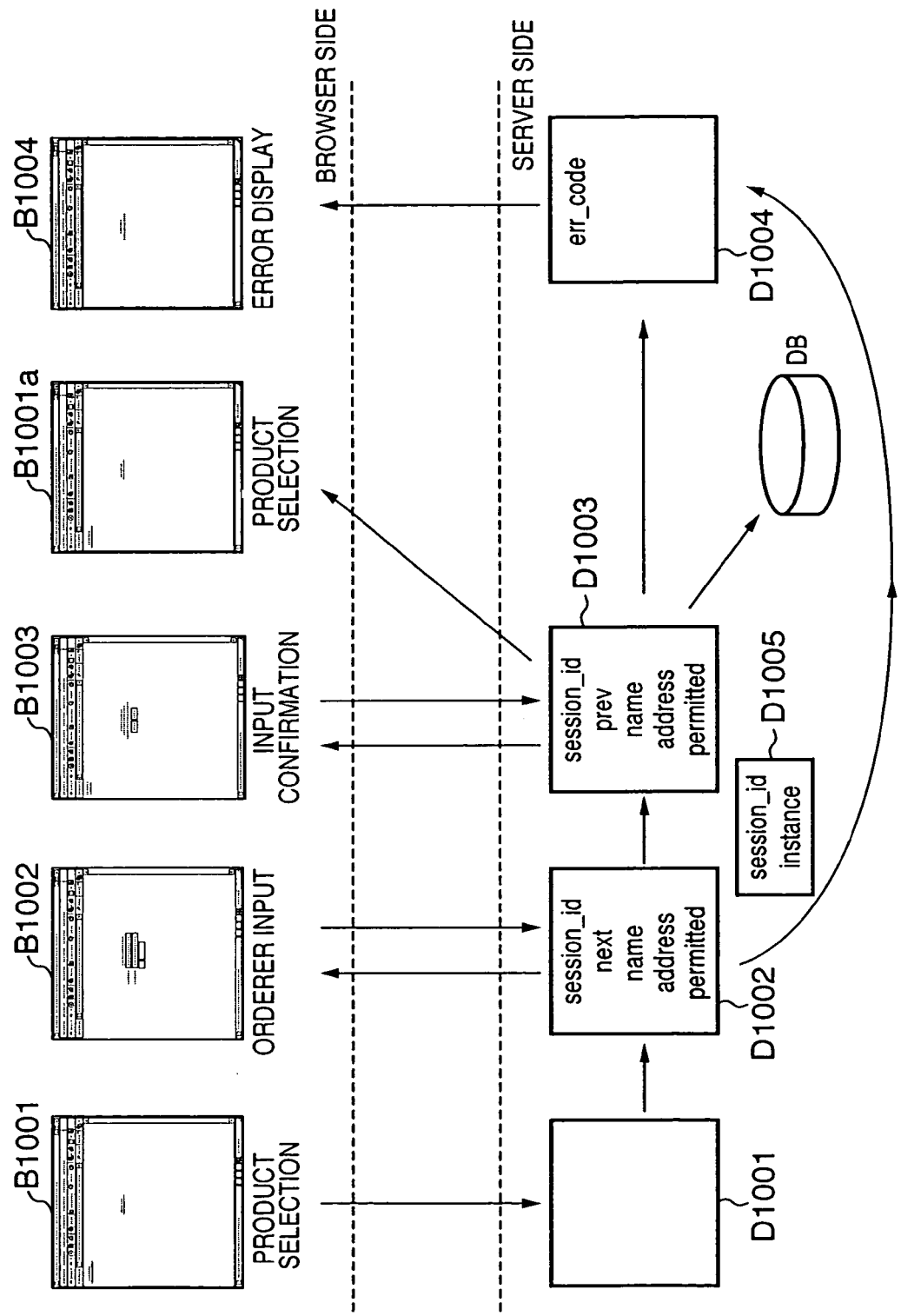
FIG. 10 is a view schematically showing a simplified process performed between a Web browser and a Web server according to the third embodiment of the present invention.
Figure 11:
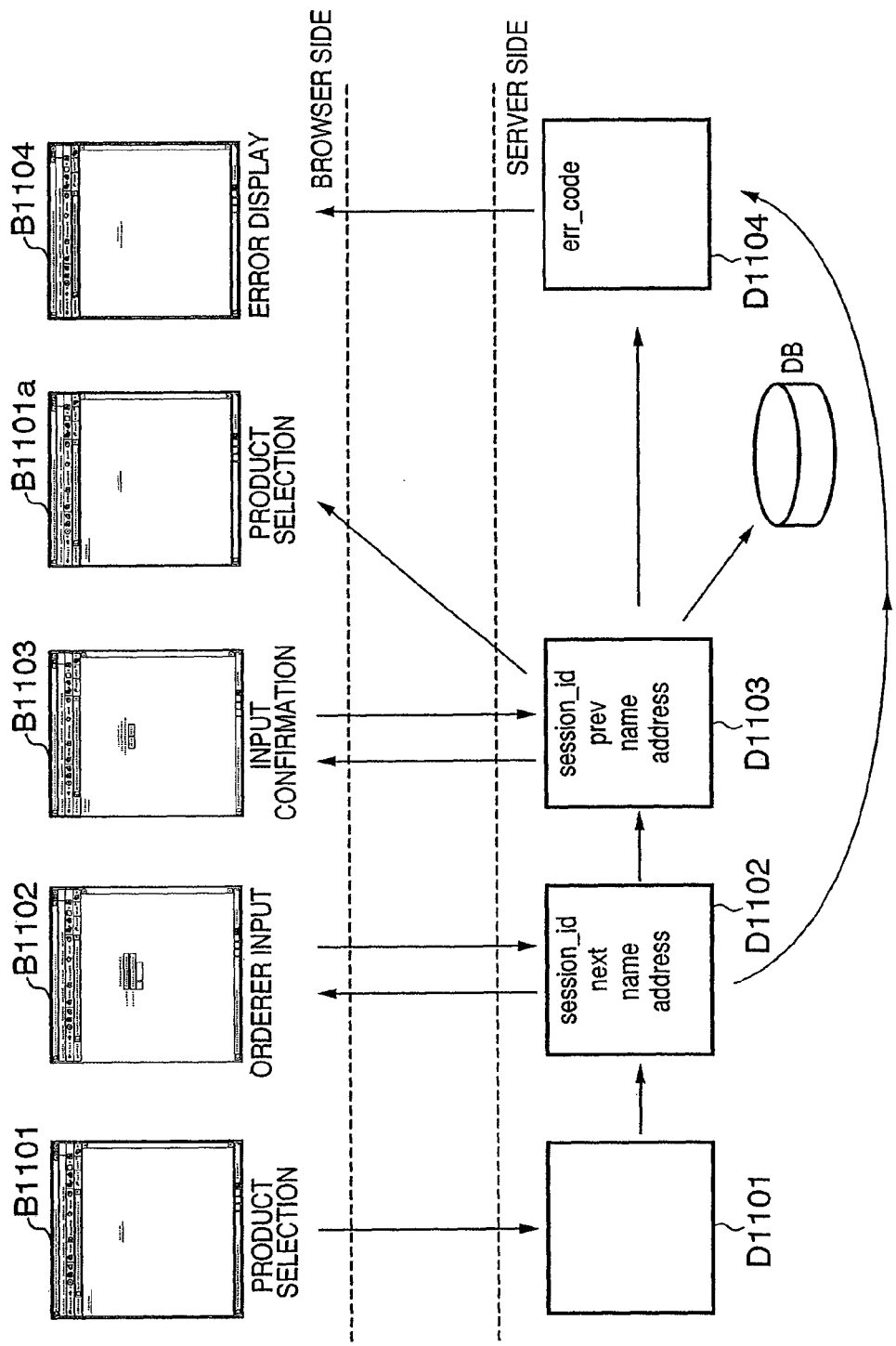
FIG. 11 is a view schematically showing a simplified process performed between a conventional Web browser and a conventional Web server.
Figure 12:
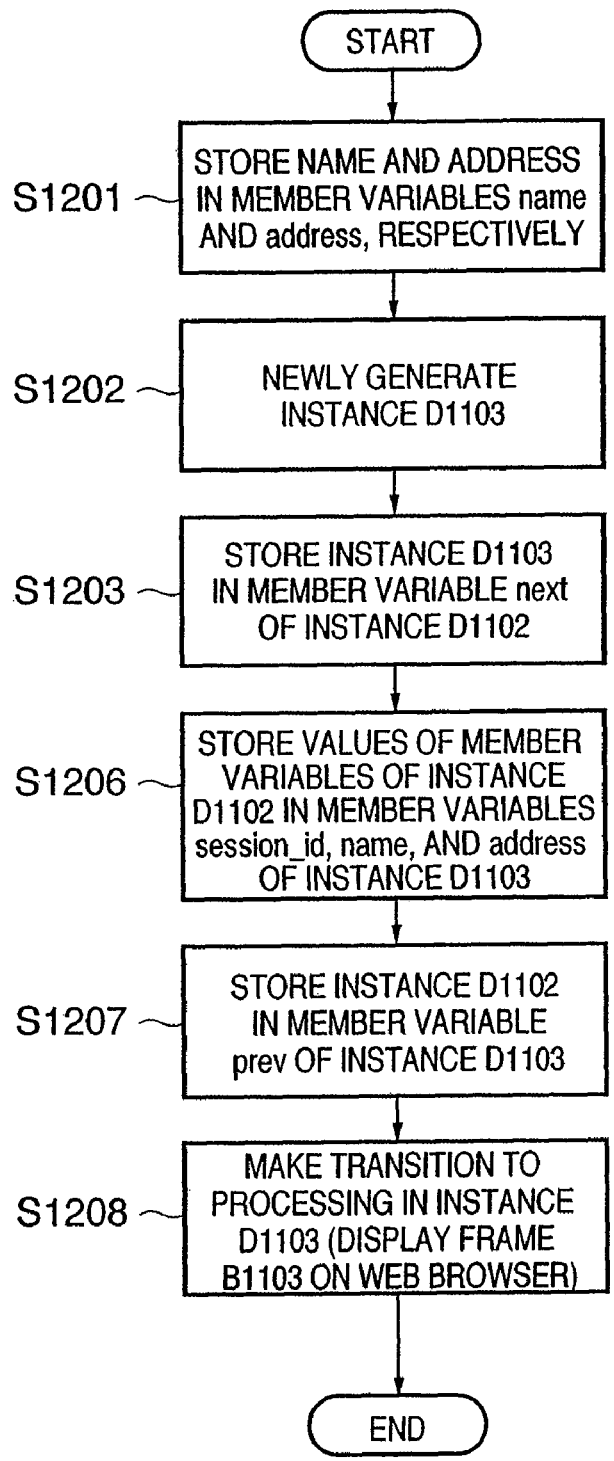
FIG. 12 is a flowchart for explaining processing in an instance D1102 in FIG. 11.

As shown in FIG. 10, this embodiment will exemplify a case wherein an instance D1005 which can be accessed from both instances D1002 and D1003 which have the same session_id and are provided for screen display on the Web browser is used to provide the function of member variable mode in the first and second embodiments.

As a method of accessing the instance D1005, a method of accessing the instance D1005 by using member variable permitted provided for each of the instances D1002 and D1003 is available. In addition, the instance D1005 has member variable session_id, and an array of instances of the same class as that of the instance D1005 (in this case, session_id needs to be unique in the array) can be accessed from a specific instance. There is also available a method of allowing a specific instance to be accessed from each of the instances D1002 and D1003 provided for screen display.

In the former accessing method, when member variable instance of the instance D1005 accessed with member variable permitted of the instance D1002 is the same as that of the instance D1002, the same control as that performed when member variable mode of the instance D202 is "true" in the first embodiment is performed. The same applies to the latter accessing method, when member variable instance of the instance D1005 having session_id identical to that of the instance D1002 in an array is the same as that of the instance D1002. In other cases, in both the former and latter accessing methods, the same control as that performed when member variable mode of the instance D202 is "false" in the first embodiment is performed.

In the former accessing method, when member variable instance of the instance D1005 which is accessed with member variable permitted of the instance D1003 is the same as that of the instance D1003, the same control as that performed when member variable mode of the instance D203 is "true" in the first embodiment is performed. The same applied to the latter accessing method when member variable instance of the instance D1005 having session_id identical to that of the instance D1003 in the array is the same as that of instance D1003. In other cases, both in the former and latter accessing methods, the same control as that performed when member variable mode of the instance D203 is "false" in the first embodiment is performed. With this operation, the same control as that in the first embodiment can be performed, and the same effects can be obtained.

The method shown in FIG. 10 makes it possible to access an instance which should currently display a screen on the Web browser (an instance which is permitted to write (update) a member variable in accordance with data received from the Web browser) from each of the instances D1002 and D1003 provided for screen display. The screen corresponding to the instance can therefore be displayed on the Web browser.

Assume that when member variable instance of the instance D1005 is the same as that of the instance D1003, a request is generated from the Web browser to the URL corresponding to the instance D1002 by, for example, pressing an OK button in an orderer input screen B1002. In this case, the instance D1002 can acquire the instance D1003 from member variable instance of the instance D1005, and display the screen B1003 on the Web browser by transferring the control to the instance D1003. In addition, at this time, the instance D1002 is an instance which is not permitted to write. For this reason, the instance D103 can be instructed to add, to the screen B1003, a warning to the user that data input from the orderer input screen B1002 is invalid.

Note that the same control can also be performed and the same effects can be obtained when member variables name and address of each of the instances D1002 and D1003 in FIG. 10 are held in another instance as in the case shown in FIG. 9.

Other Embodiment

The present invention also incorporates a case wherein software programs for implementing the functions of the above embodiments are supplied to a system or apparatus having a computer capable of executing the programs from a recording medium directly or by wire/wireless communication, and similar functions are implemented by making the computer of the system or apparatus execute the supplied programs.

The program codes themselves which are supplied and installed in the computer to allow the computer to implement the functions/processes of the present invention also realize the present invention. That is, the computer programs themselves, which implement the functions/processes of the present invention, are also incorporated in the present invention.

In this case, each program may take any form, e.g., an object code, a program executed by an interpreter, and script data supplied to an OS, as long as it has the function of the program.

As a recording medium for supplying the programs, a flexible disk, a hard disk, a magnetic recording medium such as a magnetic tape, an optical/magnetooptical storage medium such as an MO, a CD-ROM, a CD-R, a CD-RW, a DVD-ROM, a DVD-R, or a DVD-RW, a nonvolatile semiconductor memory, or the like can be used.

An example of the method of supplying the programs by wire/wireless communication is a method of storing, in the server on the computer network, the computer programs themselves which implement the present invention or data files (program data files) which can be computer programs for implementing the present invention in a client computer, e.g., compressed files including automatic installation functions, and downloading the program data files to a connected client computer. In this case, each program data file can be divided into a plurality of segment files, and the segment files can be stored in different servers.

That is, the present invention incorporates a server apparatus which downloads the program data files for allowing a computer to implement the functions/processes of the present invention to a plurality of users.

In addition, the following operation can be performed. The programs of the present invention are encrypted and stored in a storage medium such as a CD-ROM. Such storage media are then distributed to users. A user who satisfies a predetermined condition is allowed to download key information for decryption from, for example, a home page through the Internet. The user executes the encrypted programs by using the key information to make the computer install the program, thereby implementing the functions/processes of the present invention.

The functions of the above embodiments are realized not only when the readout programs are executed by the computer but also when the OS or the like running on the computer performs part or all of actual processing on the basis of the instructions of the programs.

The function of the above embodiment is also realized when the programs read out from the storage medium is written in the memory of a function expansion board inserted into the computer or a function expansion unit connected to the computer, and the CPU of the function expansion board or function expansion unit or the like performs part or all of actual processing on the basis of the instructions of the programs.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-275031 filed on Sep. 22, 2004, which is hereby incorporated by reference herein.

What is claimed is:

1. An information processing system in which a server apparatus and a client apparatus are connected via a network, wherein the server apparatus is configured to make the client apparatus display a plurality of screen data by transmitting the plurality of screen data to the client apparatus, and the client apparatus is configured to transmit input information input by using each of the plurality of screen data displayed on the display to the server apparatus, wherein the server apparatus comprises:
a storage unit configured to maintain, for each of the plurality of screen data, a variable having either a first value indicating that input information, which is input by using corresponding screen data, is permitted to be stored into a predetermined memory region, or a second value indicating that the input information is not permitted to be stored into the predetermined memory region;
an updating unit configured to update the variable corresponding to first screen data and maintained in said storage unit from the first value to the second value, in response to receiving a request for second screen data from the client apparatus, which is subsequent to the first screen data, after transmission of the first screen data to the client apparatus; and a storage control unit configured to, when input information is received from the client apparatus, store the input information into the predetermined memory region if the variable corresponding to screen data used to input the received input information and maintained in said storage unit has the first value, and to not store the received input information if the variable corresponding to the screen data used to input the received input information has the second value, and wherein the client apparatus comprises:

a transmission unit configured to transmit, after the first screen data is received from the server apparatus, first input information, which is input using the first screen data, to the server apparatus; and a requesting unit configured to transmit, after the first input information is transmitted to the server apparatus by the transmission unit, the request for the second screen data to the server apparatus.

2. A server apparatus connected to a client apparatus via a network, where the server apparatus is configured to make the client apparatus display a plurality of screen data by transmitting the plurality of screen data to the client apparatus and to receive input information, which is input by using each of the plurality of screen data, from the client apparatus, the sever apparatus comprising:

a storage unit configured to maintain, for each of the plurality of screen data, a variable having either a first value indicating that input information, which is input by using corresponding screen data, is permitted to be stored into a predetermined memory region, or a second value indicating the input information is not permitted to be stored into the predetermined memory region;

an updating unit configured to update the variable corresponding to first screen data and maintained in said storage unit from the first value to the second value, in response to receiving a request for second screen data from the client apparatus, which is subsequent to the first screen data, after transmission of the first screen data to the client apparatus; and a storage control unit configured to, when input information is received from the client apparatus, store the input information into the predetermined memory region if the variable corresponding to screen data used to input the received input information and maintained in said storage unit has the first value, and to not store the received input information if the variable corresponding to the screen data used to input the received input information has the second.

3. The server apparatus according to claim 2, wherein the updating unit is further configured to update the variable corresponding to the first screen data from the second value to the first value if a request for the first screen data is received again from the client apparatus after the second screen data is transmitted to the client apparatus.

4. A method of processing information by an information processing system in which a server apparatus is connected to a client apparatus via a network, where the server apparatus is configured to make the client apparatus display a plurality of screen data by transmitting the plurality of screen data to the client apparatus and to receive input information, which is input by using each of the plurality of screen data, from the client apparatus, the method comprising, in the server apparatus:

a storage step of storing in a storage unit, for each of the plurality of screen data, a variable having either a first value indicating that input information, which is input by using corresponding screen data, is permitted to be stored into a predetermined memory region, or a second value indicating that the input information is not permitted to be stored into the predetermined memory region;

an updating step of updating the variable corresponding to first screen data and maintained in said storage unit from the first value to the second value, in response to receiving a request for second screen data from the client apparatus, which is subsequent to the first screen data, after transmission of the first screen data to the client apparatus; and a storage control step of storing, when input information is received from the client apparatus, the input information into the predetermined memory region if the variable corresponding to screen data used to input the received input information and maintained in said storage unit has the first value, and to not store the received input information if the variable corresponding to the screen data used to input the received input information has the second value.

5. A non-transitory computer-readable storage medium on which is stored a computer-executable program for executing a method of processing information by an information processing system in which a server apparatus is connected to a client apparatus via a network, where the server apparatus is configured to make the client apparatus display a plurality of screen data by transmitting the plurality of screen data to the client apparatus and to receive input information, which is input by using each of the plurality of screen data, from the client apparatus, the program comprising, in server apparatus:

a storage step of storing in a storage unit, for each of the plurality of screen data, a variable having either a first value indicating that input information, which is input by using corresponding screen data, is permitted to be stored into a predetermined memory region, or a second value indicating that the input information is not permitted to be stored into the predetermined memory region;

an updating step of updating the variable corresponding to first screen data and maintained in said storage unit from the first value to the second value, in response to receiving a request for second screen data from the client apparatus, which is subsequent to the first screen data, after transmission of the first screen data to the client apparatus; and a storage control step of, when input information is received from the client apparatus, store the input information into the predetermined memory region if the variable corresponding to screen data used to input the received input information and maintained in said storage unit has the first value, and to not store the received input information if the variable corresponding to the screen data used to input the received input information has the second value.

* * * * *